UNITED STATES PATENT OFFICE.

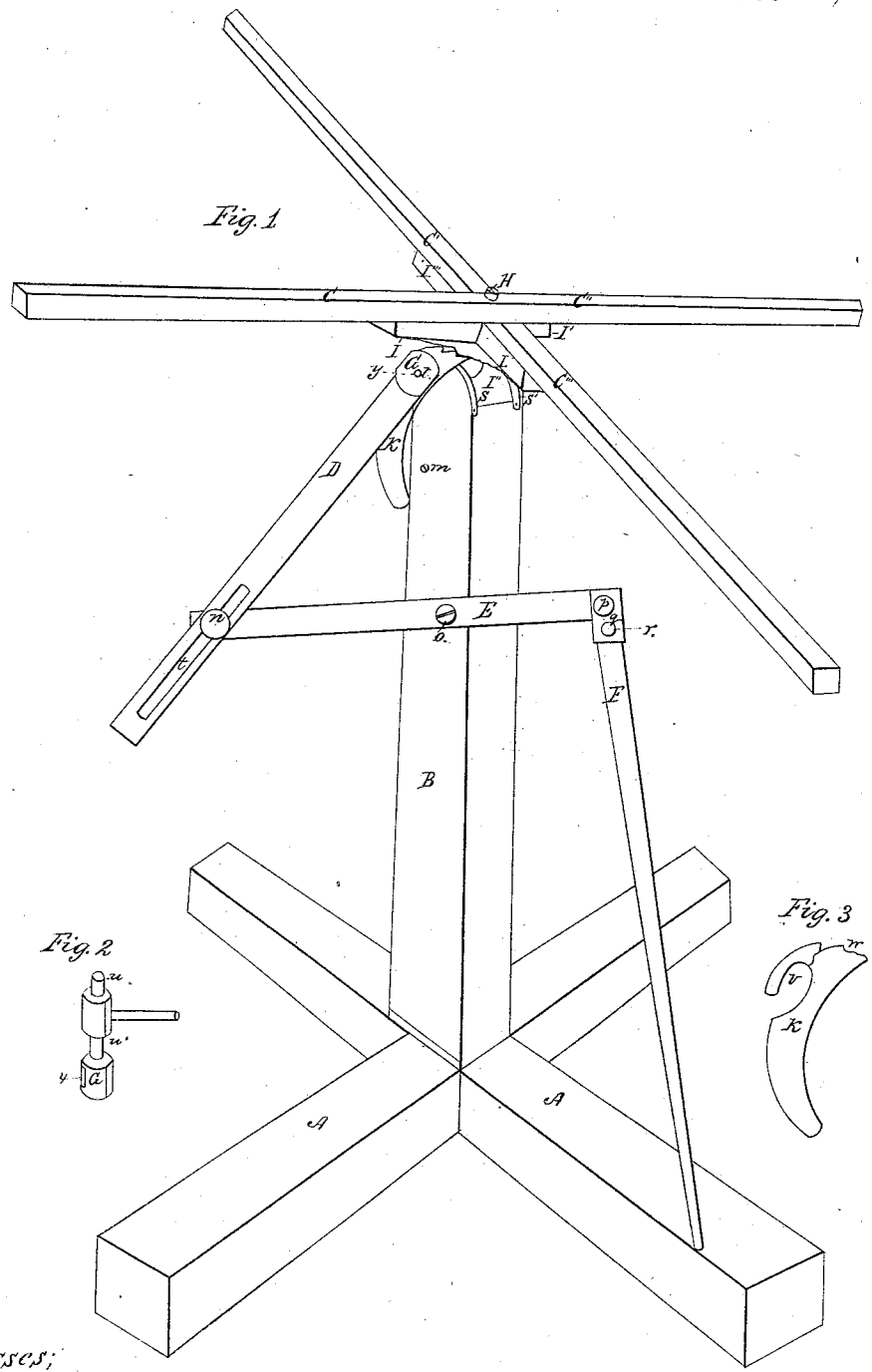

DANIEL C. COLBY, OF KEENE, NEW HAMPSHIRE, ASSIGNOR TO HIMSELF, AND DAVID W. RAWSON, OF CROYDON, NEW HAMPSHIRE.

CLOTHES-FRAME.

Specification of Letters Patent No. 22,767, dated January 25, 1859.

*To all whom it may concern:*

Be it known that I, DANIEL C. COLBY, of Keene, in the county of Cheshire and State of New Hampshire, have invented new and useful Improvements in Machines for Drying Clothes, which I denominate "Colby's Improved Clothes-Drier;" and I do declare that the following is a full, clear, and exact description of the construction and operation of the same, reference being had to the annexed drawings, making a part of this specification, in which—

Figure 1. is a perspective view of the entire machine with the arms of the reel represented as tilted; Fig. 2. represents the shaft and spindle on which the reel revolves; and Fig. 3. represents the pawl, the construction and use of which are hereinafter particularly set forth, the same letters in the various figures representing identical parts of the machine.

A. A.' are the base timbers which support the post, or standard B, on which the reel revolves. It is constructed with supports upon its top for the reception of the journals of the shaft G, so elevated as to permit the free motion of the shaft backward and forward.

S. S'. are straps of iron or other metal, which protect the supports and keep the journals of the shaft G in their places.

C. C.' C." C."' are the wooden arms of the reel attached to the projections I. I.' I." I."' of the socket H.

G is the shaft with its journals $u$. $u$.' bearing upon its upper surface, the spindle J. which penetrates the socket H, and around which the reel revolves. $x$. is a socket for the reception of the upper arm of the lever D. A shaft G is constructed in the form shown in the drawings, with its lower portion semi-cylindrical, the upper portion being a plane surface for the reception of the spindle J. and for allowing the free revolution of the reel C. C.' C." C."'

K. is a pawl the upper portion of which is curved toward the standard B. so as to enable the reel to revolve without obstruction, and upon which are serrated teeth, into which the angles of the projections I. I.' I." I."' of the socket H. rest, and thus prevent the reverse motion of the reel as it is revolved for the purpose of attaching to or removing the clothes from it. The lower arm of the pawl being made heavier than the upper, it always tends to its right position when moved from it by the action of the reel.

M. is a small stud in the standard B. which prevents the lower arm of the pawl K. from vibrating forward too far, thus keeping it in place.

$x$. is a slot in the back part of the pawl K. designed to admit and rest upon the bearing $u.'$ of the shaft G. Constructed as above described the pawl K. is adapted to and may be used in any clothes drying machine with a revolving and tilting reel.

D. is a lever attached to the shaft G. its upper arm entering the socket $x$. $t$. is a slot in its lower arm for the reception of the stud $n$. the latter moving in the slot backward and forward when the levers connected therewith are operated, thus serving to change perpetually the relations of the power operating and the weight operated upon by the lever D.

E. is a lever connected by the stud $n$. with the lever D., and with the lever F. by the metallic socket $q$. and rivet $r$.

$o$. is the fulcrum upon which the lever E. revolves.

F. is a lever connected by the socket $q$. and the rivet $r$. (which serves as its fulcrum) to the lever E.

I construct the shaft G. and the spindle J. connected therewith, the socket H. and its projecting arms I. I.' I." I."', and the pawl K. of cast iron or other suitable material. The straps S. S.' and the socket $q$. may be made of sheet iron, or other suitable metal. The stud M. and the fulcrums or bolts of the levers may be made of iron, or wood. The remaining portions of the machine may be made of wood, and of such dimensions as convenience and utility may require.

Having now described the construction of my improved clothes drier, I now proceed to set forth its mode of operation.

The important objects to be attained in the construction of this description of machines, are, first, the tilting of the reel toward the person attaching to or removing from it, the clothes to be dried; second, tilting the reel in the opposite direction in order to prevent it from obstructing the passage of horses and carriages when occasion requires; and third, to enable the person attaching or removing the clothes to or from the reel to tilt and revolve it while standing in one and the same position, thus, in the winter season and in bad weather, saving the operator the necessity of passing around the different sides of the reel for that purpose. These three objects I have attained by constructing my improved clothes drier as above described. The person operating it has only to pass to a position opposite the lever F and near enough to operate it, and pulling that lever toward that point, the reel may be tilted so that the clothes may be easily attached to or removed from the lines upon it, the operator revolving the reel as occasion may require, the pawl K, preventing the reverse motion of the reel during the operation. Having attached or removed the clothes to or from the reel, it may be returned to its proper position by returning the lever F, to its place by the standard B. And, if it shall be necessary to tilt the reel in the opposite direction, to enable carriages and teams to pass without obstruction, the result may be attained by pushing the lever F, in a direction opposite the operator.

Having above described my improved clothes drier, and its mode of operation, what I claim as my invention and desire to secure by Letters Patent, is—

The arrangement of the levers D, E, and F, as above described, in combination with the pawl K, and the shaft G, operating substantially as herein set forth.

DANIEL C. COLBY.

Witnesses:
SAMUEL C. GEORGE,
EDMUND BURKE.